Dec. 25, 1956  J. PERRELLI  2,775,279
DRUPE PITTER
Filed Dec. 19, 1952  3 Sheets-Sheet 1
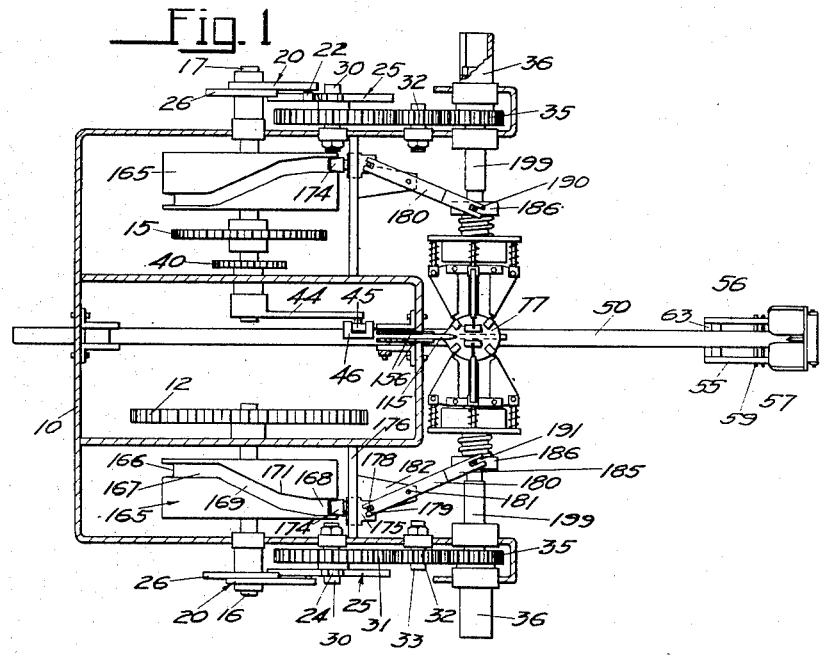
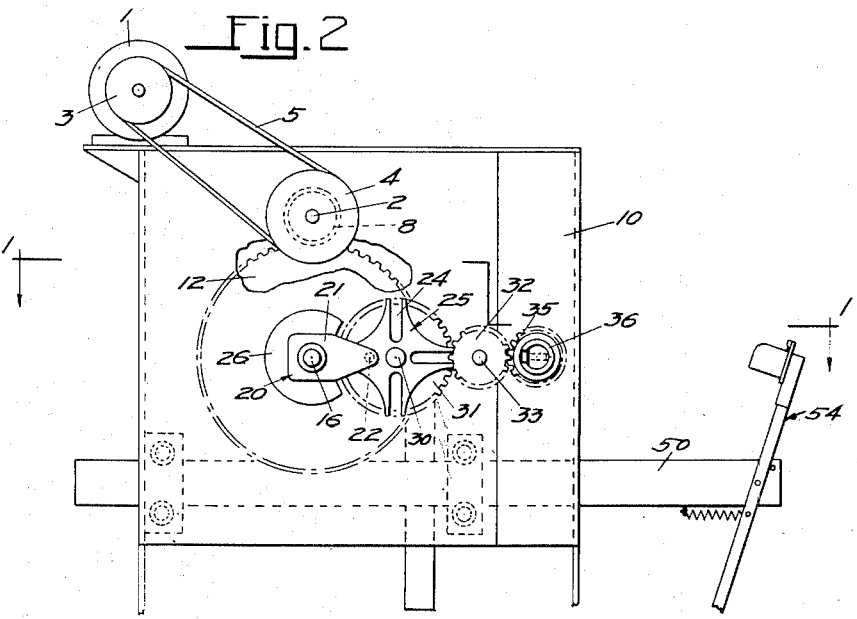
INVENTOR.
JOSEPH PERRELLI
BY
Boyken, Mohler & Beckley
ATTORNEYS

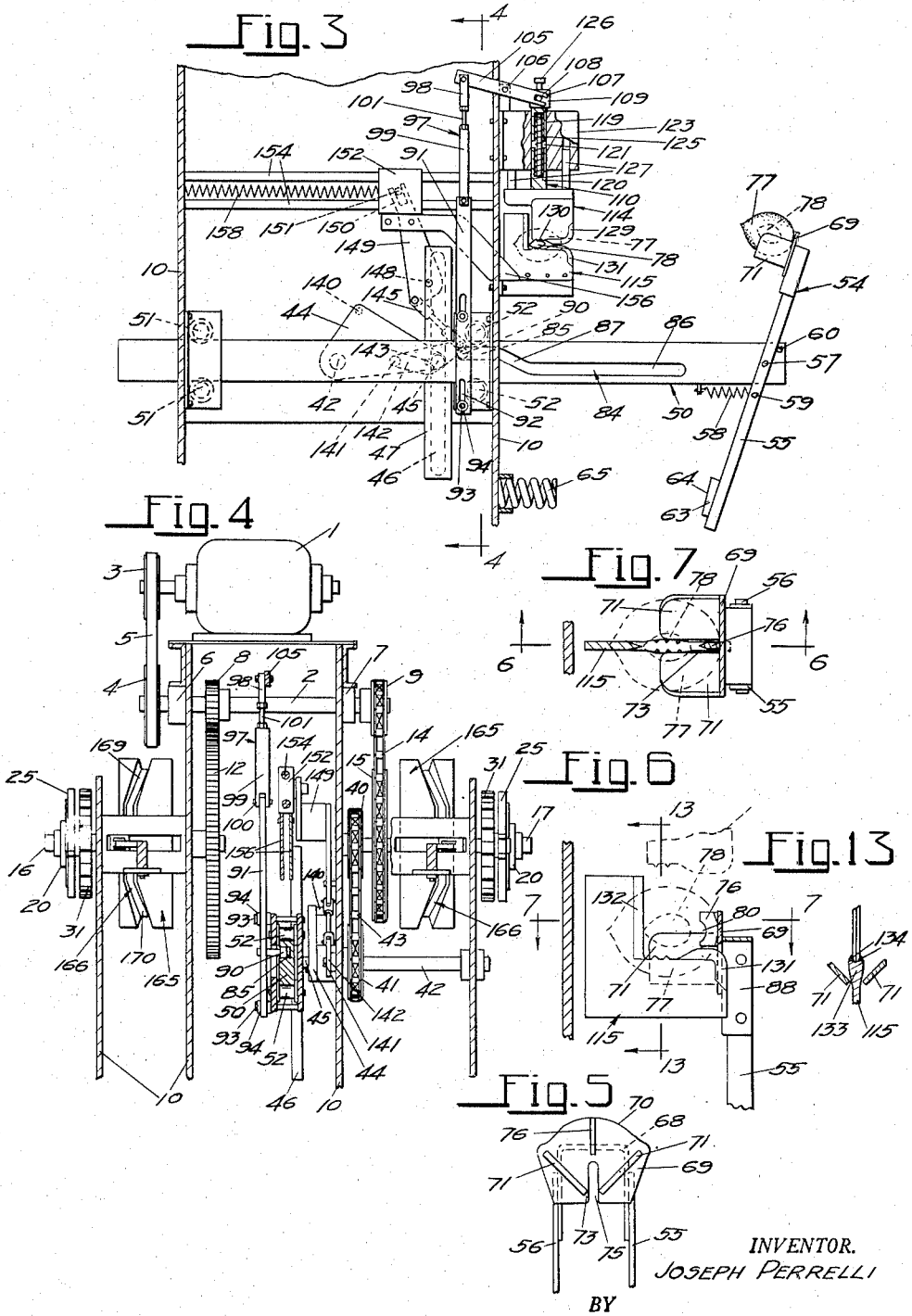

Dec. 25, 1956  J. PERRELLI  2,775,279
DRUPE PITTER
Filed Dec. 19, 1952  3 Sheets-Sheet 3
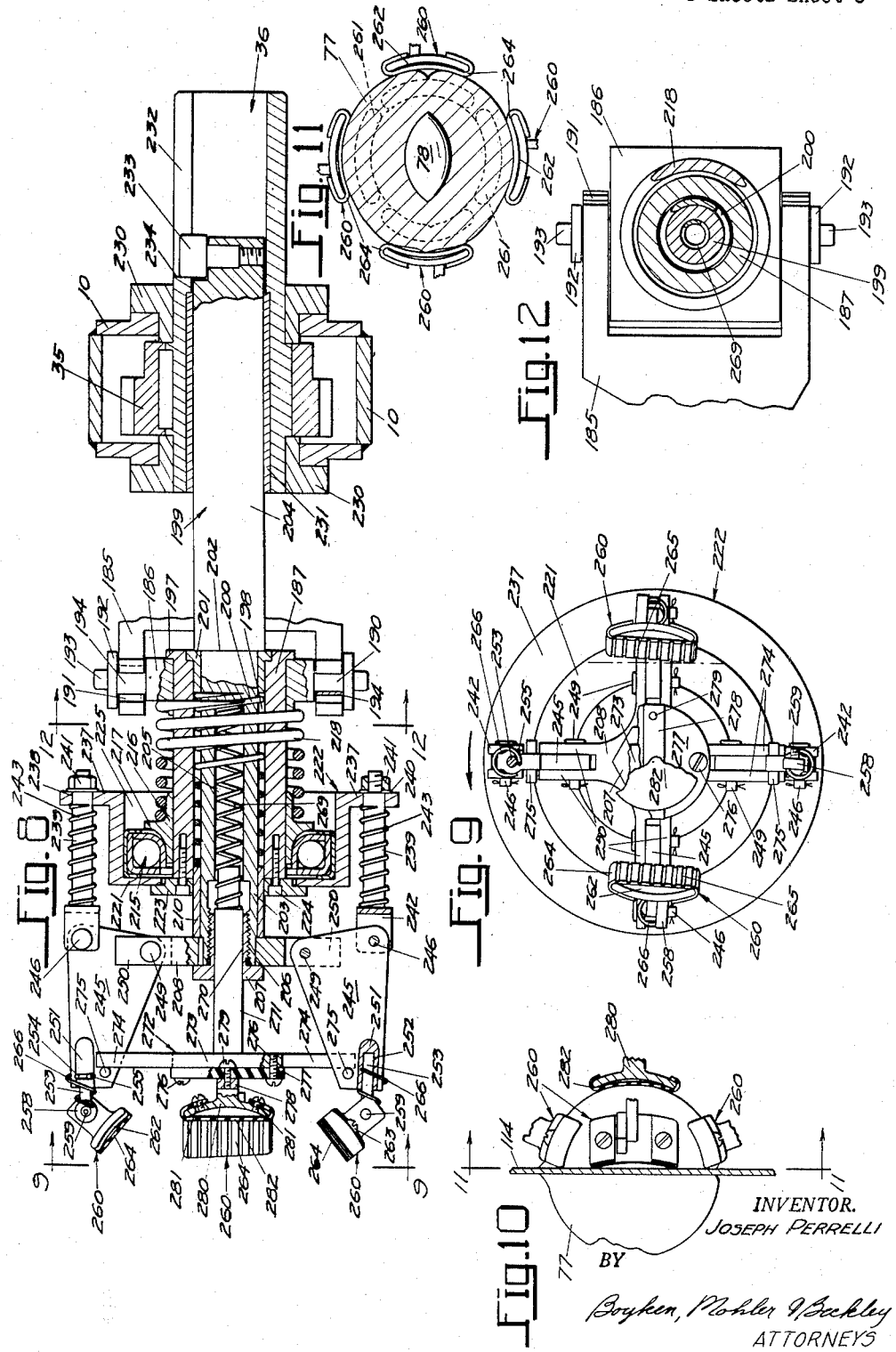
INVENTOR.
JOSEPH PERRELLI
BY
Boyken, Mohler & Berkley
ATTORNEYS ated Dec. 25, 1956

United States Patent Office 2,775,279

Patented Dec. 25, 1956

2,775,279

DRUPE PITTER

Joseph Perrelli, Richmond, Calif., assignor to Filper Corporation, a corporation of California Application December 19, 1952, Serial No. 326,832

5 Claims. (Cl. 146—28)

This invention relates to a drupe pitter and method and is a continuation in part of U. S. Letters Patent 2,664,127, dated December 29, 1953, and has for one of its objects the provision of a drupe pitter that is adapted to remove the pits from the halves of clingstone drupes without mutilating the halves of the pits and without loss of edible meat.

Another object of the invention is the provision of a drupe pitter in which the whole body of a drupe is divided to the pit only without loss of meat and in a plane substantially bisecting the body, and the halves at opposite sides of said plane are tightly circumferentially gripped close to said plane without noticeable mutilation of said halves and with sufficient force to free the halves from the pit upon rotating the pit and halves relatively about an axis extending perpendicular to said plane.

A still further object of the invention is the provision of improved means for gripping and for rotating the halves of the bisected body of a drupe (when bisected to the pit only) relative to the pit so as to free the pit from the halves.

An added object of the invention is the method of freeing the pit of a clingstone drupe from its pit by holding the pit stationary and then gripping the halves of the bisected body of meat about the pit and rotating such halves with sufficient speed to free the pit from the halves without noticeable mutilation of the halves, and also pressing the midportions of the halves toward each other and against the pit during such rotation with sufficient force to shear off the fibers connecting the pit with the halves at the surface of the pits so that there is no loss of meat or objectionable mutilation of the meat defining the pit cavities of the halves.

The problem of pitting clingstone drupes satisfactorily without loss of meat is not new. One of the first attempts made over fifty years ago involved the step of cutting the meat of a whole clingstone peach to the pit in a plane substantially bisecting the halves, and then holding one of the halves in a rubber cup or the like and manually rotating the other half through use of a cup that is similar to the one engaging the other half. This was entirely unsatisfactory since any pressure applied to the halves resulted in squashing them together and mutilating them, and the cups would not fit more than one size of fruit, and one half would release from the pit before the other, thus requiring a separate second operation to remove the pit from the other half, and the juice from the squashed halves would fill the cups and render them slippery at first and then gummy and filthy.

Over forty years after this early method was attempted with clingstone peaches, and long after it had been abandoned with respect to clingstone drupes, it was revived in a different form by abandoning the use of any cups or devices for gripping the halves, and by holding the pit between bisecting blades and then using the fingers to separate the halves from the pit should there be any tendency for the halves to stick. This idea was originally disclosed in U. S. Patent 580,563 to Totten, April 13, 1897, it being recognized by Totten that mere finger pressure by the fingers of the hand would be sufficient to separate any stuck halves from the pit of a freestone drupe. Others such as Parantean (U. S. Patent 1,392,518, October 4, 1921) and applicant himself (U. S. Patent 2,474,492, June 28, 1949) recognized that the halves of freestone peaches, apricots and the like, were practically free from the halves once the body was cut to the pit. But these disclosures were not suitable for pitting clingstone drupes and in each instance that fact was recognized.

In copending application, Serial No. 254,927, filed November 5, 1951, and issued December 29, 1953 as U. S. Letters Patent 2,664,127, the present invention is broadly disclosed whereby clingstone drupes may be clearly freed from the halves of a bisected whole drupe without using cutting knives for cutting the pits out of the halves, and without ruining the halves for canning.

Other objects and advantages will appear in the description and in the drawings.

In the drawings, Fig. 1 is a plan view of the main portion of the machine with some parts in section taken along line 1—1 of Fig. 2.

Fig. 2 is a side elevational view of the main portion of the machine showing the drive structure.

Fig. 3 is an internal side elevational view as seen from the same direction as Fig. 2.

Fig. 4 is a sectional view taken substantially along line 4—4 of Fig. 3.

Fig. 5 is a front elevational view of the drupe holding member.

Fig. 6 is a sectional view of the drupe holding member taken along line 6—6 of Fig. 7 showing its relation to the knives and the drupe.

Fig. 7 is a top plan view of the drupe holding member taken along line 7—7 of Fig. 6.

Fig. 8 is an enlarged, elevational view of the part of the machine for rotating peach halves partly broken away and in section to show structure.

Fig. 9 is a front elevational view, partially broken away, taken along line 9—9 of Fig. 8.

Fig. 10 is partial top plan view of the part of Fig. 8 showing the fruit engaging elements in engagement with the fruit.

Fig. 11 is a sectional view taken along line 11—11 of Fig. 10.

Fig. 12 is a sectional view taken along line 12—12 of Fig. 11.

Fig. 13 is a fragmentary sectional view taken along line 13—13 of Fig. 6.

In detail as seen in Figs. 2, 4, a motor 1 is connected with a counter shaft 2 by any suitable means such as a pulley 3 on motor 1 which drives a pulley 4 on shaft 2 by means of belt 5. Shaft 2 is journalled in bearings 6, 7 which are secured to the frame 10. Secured to shaft 2 intermediate its ends are a pinion gear 8 and a chain drive sprocket 9. Gear 8 is meshed with drive gear 12 on cam shaft 16 and sprocket 9 drives chain 14 which in turn drives sprocket 15 which is secured to a second cam shaft 17.

Throughout this description the portion of the machine which contains shaft 16 will be designated as "left" and the portion containing shaft 17 will be designated "right." From the foregoing description, it is obvious, that shaft 16 will rotate in a direction opposite to that of shaft 17 upon shaft 2 being driven by motor 1.

Cam shaft 16 is journalled for rotation in suitable bearings as shown in Fig. 1 and has secured to its outer end (the end opposite from gear 12) a Geneva drive arm assembly 20. Said assembly consists of an arm 21 (Fig. 2) one end of which is secured to shaft 16. The other end of arm 21 carries a cylindrical cam follower 22 which is shown in engagement with one of the four slots 24 in a Geneva spider 25. Immediately adjacent arm 21 and affixed thereto coplanar with spider 25 is a conventional Geneva locking plate 26 which prevents movement of spider 25 when it is not being driven by arm 21. Spider 25 is secured to shaft 30 which is journalled in a bearing on frame 10. Also secured to shaft 30 is a spur gear 31 which is meshed with idler pinion 32 on shaft 33. Meshed with pinion 32 is slide shaft gear 35 which is secured to slide shaft bearing 36 for a purpose to be described later.

The above drive description is applicable to both the left and right portion of the machine, the only differences being that they rotate in opposite directions and the feed drive mechanism (to be later described) is connected to cam shaft 17 in the right portion. Inasmuch as the elements described are substantially the same for both portions the reference numerals used in describing identical structures are the same.

As best seen in Figs. 3, 4 a chain drive sprocket 40 is secured to shaft 17 for driving a sprocket 41 secured on shaft 42 by means of chain 43.

Near one of its apexes a generally triangularly shaped drive crank 44 is secured to shaft 42 at the end of said shaft that is nearest the center of the machine. Cylindrical cam follower 45 is rotatably secured to crank 44 at another of its apexes and said cam follower travels in a straight, vertically disposed recess or cam slot 46 (Fig. 3) in vertical feed drive bar 47 which is centrally positioned between the left and right portions of the machine. Drive bar 47 is secured at its midsection to the midsection of horizontal feed arm 50 which reciprocates horizontally between two pairs of rollers 51, 52 upon being driven by crank 44. Rollers 51 are fixed to frame 10 at one end of feed arm 50 and rollers 52 are secured to another portion of frame 10 adjacent feed drive bar 47 as seen in Fig. 3.

At the end of feed arm 50 opposite rollers 51, outwardly disposed from the main portion of the machine, is feed cup assembly 54. Said assembly is composed of two parallel, slantingly disposed bars 55, 56 which straddle arm 50 and are rotatably secured near the center portion of their length to said arm by pivot pin 57 extending therethrough. Tension spring 58, secured at the end nearest the main portion of the machine to arm 50 and at its other end to a pin 59 extending between bars 55, 56 below arm 50 serves to yieldably urge said bars against stop pin 60 which is fixed to feed arm 50 above pivot pin 57 and on the opposite side of bars 55, 56 from spring 58. Thus spring 58 tends to rotate bars 55, 56 in a clockwise direction (as viewed in Fig. 3) and stop pin 60 opposes said rotation to hold bars 55, 56 in said slanting disposition relative to feed arm 50.

The ends of bars 55, 56 below pivot pin 57 are fixed together by cross member 63 which may be rectangular in shape and extending between said ends so as to provide a striking face 64 directed toward the main portion of the machine. In a horizontal line with member 63 and secured to frame 10 directly under arm 50 is compression spring 65 which projects toward member 63 from the main portion of the machine.

Extending between the ends of bars 55, 56 which are opposite cross member 63 is an inverted U-shaped member 68 (Figs. 5–7) the downwardly projecting legs of which are rigidly secured to said ends of bars 55, 56 as by welding. Affixed to member 68 and bars 55, 56 so as to provide a face directed toward the main portion of the machine is a generally trapezoidally shaped backing plate 69 whose upper and longer edge 70 (Fig. 5) extends arcuately upwardly from said U-shaped member. A pair of slanting disposed drupe supporting elements 71 project outwardly from backing plate 69 toward the main portion of the machine to form a substantially V-shaped feed cup, the bottom of which is slotted as at 73. Backing plate 69 is centrally slotted as at 75 (Fig. 5) from its lower edge vertically to its midpoint. Said cup that is formed by supporting elements 71 and backing plate 69 is adapted to hold a drupe for movement toward the main portion of the machine and is substantially symmetrical about the vertical central plane of said main portion of the machine and slots 73 and 75 are bisected by said plane. Also projecting from backing plate 69 in the same direction as elements 71 and substantially coplanar with said central plane is a knife blade element 76 which is adapted to cut the flesh of a drupe 77 at its stem or blossom end as said drupe is placed in said cut. As best seen in Figs. 6, 7 blade element 76 preferably cuts only the flesh at the stem end of drupe 77 to pit 78 and also tends to hold said drupe in said feed cup. Blade element 76 may be slightly recessed and blunt along its sharpened leading edge as at 80 to prevent pit 78 from being cut by or sticking to blade element 76.

Recessed into the side of feed arm 50 is an extended two-step horizontal cam slot generally designated 84 (Fig. 3). The upper step or dwell portion 85 of cam slot 84 is substantially centrally located with respect to the longest or horizontal dimension of feed arm 50 and is relatively short compared to the lower step or dwell portion 86 which extends toward the end of arm 50 which carries the feed cup assembly. These two dwell portions are joined by a slantingly disposed cam portion 87. Riding in cam slot 84 is a cylindrical follower 90 which is rotatably secured to a vertically disposed blade drive bar 91. Bar 91 is slotted intermediate its ends as at 92 to receive therethrough bolts 93 which are secured at their shank ends to frame 10. Washers 94 may be positioned between the heads of bolts 93 and bar 91. It will be seen from the above described arrangement that upon horizontal reciprocation of feed arm 50 by crank 44 cam follower 90 will move from the upper dwell 85 to the lower dwell 86 of cam slot 84 and back causing blade drive bar 91 to reciprocate vertically with respect to bolts 93.

Rotatably secured to the upper end of bar 91 (that is farthest from bolts 93) and substantially colinear therewith is an adjustable link generally designated 97. Said link is composed of two portions, an upper, 98 and a lower, 99 which carries a clevis 100 at its lower end pinned to the upper end of bar 91. Portions 98 and 99 are joined together with a stud bolt and nut assembly 101 which provides for the longitudinal adjustment of link 97. The upper end of upper portion 98 is rotatably pinned to blade pivot link 105 which is pivoted near its midpoint on pin 106 secured to an extension of frame 10. The end of pivot link 105 which is farthest from portion 98 may be formed with a slotted clevis 107. The pin 108 that rides in the slot in clevis 107 extends through each side of block 109 which is integral with the upper end of blade drive post 110. The lower end of drive post 110 is rigidly secured to a vertical upper guillotine blade 114 which is coplanar with the aforementioned central plane of the machine. Directly below upper blade 114 and coplanar therewith is lower blade 115 that is rigid with frame 10.

Drive post 110 is composed of two vertical and vertically aligned tubular portions 119, 120. The lower end of lower portion 120 is closed, and as mentioned before, is fixed to upper blade 114. Upper portion 119 of post 110 is closed at its upper end by block 109. Said portions are separated and are adapted to reciprocate vertically in bore 121 in knife support block 123 which is secured to frame 10. Within the hollow interior of portions 119, 120 and acting against the closed ends thereof is a compression spring 125. Clamp rod 126 is surrounded by the coils of spring 125 and is fixed at its lower end to the lower end of portion 120 while its upper end is free to reciprocate in a central bore in block 109. The upper end of rod 126 is formed with an upset portion or head so that on upward movement of block 109 rod 126 will also be driven upwardly.

It will be seen from the foregoing description that when blade drive bar 91 is moved upwardly by cam portion 87 pivot link 105 will be rotated so as to force block 109 downwardly causing blade 114 to be yieldably driven downwardly. Upon downward motion of bar 91 blade 114 will correspondingly be raised. Guide posts 127 fixed to the upper side of blade 114 and adapted to reciprocate in bores in block 123 are provided to stabilize the movement of block 114.

Upper blade 114 is provided with sharpened edge 129 and teeth 130. Lower blade 115 has sharpened edges 131 and 132 and its pit anvil is thickened as at 133 (Fig. 13) and the teeth 134 therein are spaced in rows along either side of the thickened portion. This is important to assure the pit being held by the teeth should the pit be tilted. Lower blade 115 is secured to frame 10.

To the third apex of drive crank 44 is secured an outwardly protecting knob 140. This knob is timed to collide with another knob 141 on link 142 pivotally secured to frame 10 by pin 143. The other end of link 142 is rotatably secured to one end of adjustable link 145. The other end of link 145 is pinned to reject crank 149 which turns about fixed pivot 148. The drive end of crank 149 is slotted at 150 to receive pin 151 projecting from reject slide 152. Reject slide 152 is free to reciprocate horizontally on bars 154 which are secured to frame 10. Fixed to the lower portion of slide 152 is a pair of reject arms 156 which extend on both sides of lower blade 115. When knob 140 strikes knob 141 this causes reject crank 149 to drive reject slide 152 forward toward blades 114, 115 and reject arms 156 will pass on either side of blades 114, 115 knocking loose any pit 78 which may be stuck thereto. Tension spring 158 is provided between the rear end of slide 152 and frame 10 to return said slide to its inoperative position after the above described movement.

Returning to the left and right portions of the machine (Figs. 1, 4) as partially described previously, it will be remembered that said portions are complementarily formed so that only the right portion will be described; the numerals used referring to identical structure in both portions.

Secured to cam shaft 17 intermediate its ends is a drum cam 165 formed with a circumferential groove or cam slot 166. Said cam slot is formed with two dwell portions 167, 168 (Fig. 1) which extend in a plane at right angles to the rotational axis of said drum cam, are on diametrically opposed sides of said cam, and are spaced apart in the direction of said rotational axis. Joining the ends of dwell portions 167, 168 I provide rise portions 169, 170 which extend slantingly disposed relative to the extension of said dwell portions. The line of rise of portions 169, 170 may be broken slightly as at 171 to provide for a different rate of rise of different halves of portions 169, 170.

A cylindrical cam follower 174 is adapted to travel in cam slot 166 and is rotatably secured to drum cam slide 175. Cam slide 175 is mounted for horizontal reciprocation parallel to the rotational axis of drum cam 165 in cam slide guide 176 which is rigid at each end with frame 10. Cam slide 175 may be a block adapted to slide within an elongated recess in cam slide guide 176. At the side of cam slide 175 opposite cam follower 174 is a vertical pin 178 rigid with said cam slide. A longitudinally extending, open-ended slot 179 is formed in one end of horizontally extending pivot arm 180 and pin 178 is adapted to travel therein. Arm 180 is pivoted intermediate its ends by being rotatably secured to pivot pin 181 which in turn is fixed to a mounting block 182. Said mounting block may be fixed to an extension of slide guide 176 below cam slide 175.

At the end of pivot arm 180 opposite slot 179 said arm is formed with a yoke or clevis 185 the arms of which are adapted to extend above and below toggle collar 186.

Said toggle collar is a block formed with a horizontally extending central bore to receive therethrough spring slide bearing 187 (Figs. 1, 8). At the upper and lower sides of collar 186 I provide vertically, outwardly extending studs 190 which are adapted to be received within open-ended, longitudinally extending slots 191 in the arms of yoke 185. Washers 192 and bolts 193 may be provided at the free ends of studs 190 to retain surrounding bushings 194 thereon.

It is obvious that upon rotation of drum cam 165 cam slide 175 will be made to reciprocate which will in turn reciprocate toggle collar 186 by means of pivot arm 180.

Spring slide bearing 187 is in the form of a cylinder with an annular radially outwardly projecting flange 197 at one end bearing against one face of toggle collar 186 (Fig. 8). An axially extending central through bore 198 is provided in bearing 187 for receiving therethrough slide shaft 199. Said bore is of sufficiently larger diameter than shaft 199 to also receive therein helical compression 200 which surrounds shaft 199. Press fitted into the end of bore 198 nearest flange 197 is a flanged bushing 201 the interior end of which abuts one end of spring 200. The exterior end of bushing 201 abuts a shoulder 202 intermediate the ends of shaft 199. In other words, the portion of slide shaft 199 that is received in bore 198 and surrounded by spring 200 is reduced in diameter compared to that portion extending outwardly and rearwardly (to the right in Fig. 8) of bearing 187. The reduced diameter portion 203 of shaft 199 is provided with an axial bore 205 which is internally threaded at its open end 206 to threadedly receive slide shaft nut 207 therein. Immediately adjacent nut 207 and keyed to the free end of shaft portion 203 is jaw support spider 208.

Surrounding shaft portion 203 partially internally of bore 198 is a plain bushing 210 which may be secured to shaft portion 203 by means of a press fit. One end of bushing 210 abuts spider 208 whereas the other end abuts the end of spring 200 opposite bushing 201. Since bushing 201 is free to slide on shaft portion 203 and bushing 210 is not, spring 200 tends to yieldably urge bushing 201 (and bearing 187 to which it is secured) toward shoulder 202. Bushings 201, 210 also act as bearings upon which spring slide bearing 187 may reciprocate horizontally with respect to slide shaft 199.

Circumferentially surrounding bearing 187 at the end farthest from collar 186 is a conventional radial thrust bearing 215 and retainer 216. Said retainer may be a band with a centrally located radially outwardly extending, annular flange 217 which is urged against thrust bearing 215 by one end of helical compression main spring 218. Said main spring surrounds spring slide bearing 187 and abuts toggle collar 186 at the other end of spring 218 opposite retain 216. Thrust bearing 215 is thereby urged forwardly (to the left in Fig. 8) into engagement with the inwardly directed flange 221 formed at the forward end of cylindrically shaped jaw spring retainer 222. Flange 221 is restrained from movement forwardly of bearing 187 by circular thrust bearing flange 223 which is secured as by circumferentially spaced bolts 224 to the forward end of bearing 187. The main cylindrical portion of jaw spring retainer 222 encloses within its central bore 225 thrust bearing 215 and thrust bearing retainer 216.

Jaw spring retainer 222 is formed with an outwardly extending circumferential flange 237 at the rearwardly directed end opposite that containing flange 221. At equally spaced points around the periphery of flange 237 is provided a plurality of holes 238 adapted to slidably receive therethrough a number of jaw support rods 239. Fig. 9 shows four of such rods. Said rods extend forwardly perpendicularly from flange 237 and their rearwardly directed reduced diameter ends are threaded to receive thereon washer 240 and nut 241. The forwardly directed end (left end in Fig. 8) of each rod 239 is formed with a clevis 242 to which jaw support arm 245 is adapted to be pivotally secured as by pivot pin 246. At a point on each support arm 245 spaced inwardly (toward the axis of rotation of shaft 199) from pin 246 is a second pivot pin 249 which pivotally secures arm 245 between a pair of outwardly directed ears 250 formed integrally with jaw support spider 208. Since there are four jaw support arms shown it is necessary that spider 208 contain four pairs of said ears.

At the forwardly directed end of each jaw support arm 245 spaced from pins 246, 249, each arm is upset to form a tubular bearing portion 251 whose longitudinally, horizontally extending central bore 252 is adapted to rotatably receive therein jaw support pin 253. To retain pin 253 within said bore from longitudinal movement I provide a vertically extending slot 254 in the sidewall of bearing portion 251 within which stop pin 255 (which is secured to pin 253) is adapted to reciprocate about the axis of bore 252. At the end of each jaw support pin 253 that extends forwardly and outwardly of bore 252 is provided flattened portion 258 which is adapted to be rigidly secured to a drupe engaging jaw 260 as by recessed head bolt 259.

Said drupe engaging jaws are formed with radially inwardly (toward the axis of rotation of shaft 199) directed slantingly disposed (relative to said axis) concavely curved surfaces 262 that are adapted to substantially correspond to the curved outer surface of said drupe. Stretched across said concavely curved surface of each jaw 260 and secured to the extremities thereof by cap screws 263 is a strip or band of relatively soft, elastic, rubber or plastic material 264 adapted to conform to the curved outer surface of a drupe 77 when jaw 260 is pressed thereagainst as shown in Fig. 11. This band on each jaw may be slightly tensioned and is taut.

A torsion spring 266 is positioned surrounding jaw support pin 253 and bearing portion 251 of jaw support arm 245 so as to rotatively urge jaw 260 in one direction. This rotation is limited by stop pin 255 abutting the end of slot 254 as seen in Fig. 8. Thus the bands are yieldably held in positions extending tangentially of a circle coaxial with shaft 199.

Slidably received within a longitudinally extending central bore 270 in slide shaft nut 207 (a continuation of bore 205 in shaft 199) is the shaft portion 271 of cup support slide 272. Shaft portion 271 is formed with a reduced diameter portion at its rearwardly directed end which acts as an internal guide for helical compression spring 269. Said spring acts within bore 205 so as to urge shaft portion 271 axially outwardly of said bore. The forwardly directed end of shaft portion 271 is rigidly secured at right angles to a vertically extending double fork 273. The two arms 274 (Figs. 8, 9) of each fork 273 extending both above and below the axis of shaft portion 271 are spaced to slidably receive between them the end portions of upper and lower support arms 245 near bearing portions 251. Arms 245 are thereby permitted radial reciprocation between arms 274 but should arms 245 be rotated about the axis of shaft portion 271 cup support slide will also be rotated thereby.

Projecting outwardly from opposite sides of upper and lower arms 245 so as to abut the ends of arms 274 are stop members 274. Said stop members prevent forward movement of cup support slide 272 axially away from slide shaft 199.

Secured centrally to the forwardly directed side (opposite shaft portion 271) of fork 273 by cap screws 276 is a flexible, circular coupling disc or plate 277 of rubber, leather or any other suitable material. Coupling bar 278 is secured as by cap screws 279 to the opposite side of plate 277 and extends across the face of said plate at right angles to fork 273 so as to form a universal joint connection between bar 278 and fork 273.

Rigidly secured to the forwardly directed face of bar 278 as by welding or internal screws (not shown) is a generally circular, concavely curved cup 280 whose forwardly directed concave surface is adapted to substantially correspond with the curved outer surface of a drupe. Stretched across said concave surface (similar to jaws 260) is a sheet of relatively soft, elastic and flexible rubber or plastic material 282 which is held in place by cap screws 281. Said sheet of rubber is adapted to substantially conform to the outer surface of a drupe 78 (Fig. 10) when cup 280 is pressed against said drupe.

The aforementioned slide shaft bearing 36, upon which slide shaft gear 35 is secured supports for rotation the enlarged portion 204 of slide shaft 199. Bearing 36 is essentially a cylindrical sleeve and is itself journalled within a split bearing 230 which abuts both sides of gear 35 and is rigid with frame 10. Thus bearing 36 is permitted to rotate but restrained from moving laterally. A plain bushing 231 may be provided to form a more suitable bearing surface between shaft 199 and bearing 36.

Bearing 36 is slotted longitudinally at its rearwardly directed end as at 232. Adapted to travel in said slot and rotatably secured to the rear end of shaft 199 is cylindrical cam follower or spline 233 whose axis of rotation is perpendicular to that of shaft 199. Slide shaft 199 is thereby permitted rotation only upon rotation of bearing 36 by gear 35 but may reciprocate along its axis of rotation within bearing 36 relative to said bearing restrained only by cam follower or spline 233 coming in contact with the forward end 234 of slot 232.

In operation, referring to Figs. 3, 6, a drupe 77 is placed in the cup of cup assembly 54 preferably with its suture in a vertical plane and the flesh near its stem or blossom end impaled on blade element 76, when cup assembly 54 is at a point farthest removed from the main portion of the machine. As crank 44 rotates (in a clockwise direction as seen in Fig. 3) feed arm 50 and feed cup assembly 54 are driven toward the main portion of the machine so that striking face 64 of cross member 63 contacts spring 65. Since arm 50 will continue to be driven in this same direction bars 55, 56 will be rotated about pin 57 against the tension in spring 58 so as to arcuately feed drupe 77 into impaling engagement with blade 115 and between blades 114, 115.

During the inwardly (toward the main portion of the machine) directed movement of feed arm 50 cam follower 90 is directed from the upper dwell 85 to the lower dwell 86 of cam slot 84 thereby raising upper blade 114 sufficiently only to allow clearance for pit 78 to pass between sharpened edges 129, 131 of blades 114, 115 respectively. Drupe 77 continues in its aforementioned path until pit 78 contacts upwardly extending blade edge 132 on lower blade 115 (the dotted position of drupe 77 in Figs. 3, 6). It will be seen that the flesh of the drupe in the plane of blades 114, 115 is thereby cut substantially circumferentially of pit 78 and in to said pit. Thereafter the two halves of said drupe are held together substantially only by the portion of flesh clinging to the pit.

As crank 44 rotates further arm 50 is driven in the opposite direction and feed cup assembly 54 returns to the position shown in Fig. 3. During this return upper blade 114 is driven downwardly by cam 84 so as to firmly engage pit 78 between teeth 130 on blade 114 and teeth 134 on blade 115.

At substantially the same time that blade 114 is being lowered, cam followers 174 (Figs. 1, 4) are being directed oppositely outwardly from the central plane of the machine by rise portions 170 of drum cams 165. (Said followers are shown at their outward most limit in Figs. 1, 4). This movement of followers 174 pivots arms 180 which drive toggle collars 186 oppositely inwardly or toward each other.

As best seen in Fig. 8, during the first part of its forward movement each collar 186 yieldably drives both jaw spring retainer 222 and slide shaft 199 forwardly with it through main spring 218 and spring 200 respectively. Cup 280 is thereby yieldably driven against the outer curved surface of drupe 77 (due to spring 269) as shown in Fig. 10. When the forward movement of slide shaft is restrained by cam follower 233 reaching the forward end 234 of slot 232, collar 186 continues to be driven forwardly, compressing spring 200 and continuing to yieldably drive forward jaw spring retainer 222.

Since jaw support spider 208 is restrained from forward movement the yieldably forwardly driving of pins 246 by jaw spring retainer 222 causes drupe engaging jaws 260 to swing generally radially inwardly and come into engagement with the periphery of a half of drupe 77 (Fig. 10).

As described before the other, identical portion of the machine performs the same function and grips the other half of drupe 77 at the same time. At this time the cam followers 22 of Geneva drive arms 20 (Fig. 2) engage a slot 24 in each Geneva spider 25 thereby rotating slide shafts 199, jaws 260, and cups 280. Since the left and right portions of the machine are rotated in opposite directions opposite halves of drupe 77 are rotated in opposite directions simultaneously and with the same force shearing from pit 78 which is firmly held by blades 114, 115.

During the rotation of shafts 199 cam followers 174 are riding in dwell portions 168 of drum cams 165. As said cams continue to rotate and said followers ride on rise portions 169 jaws 260 are freed from drupe 77 to allow the drupe halves to fall away from blades 114, 115. Blade 114 rises away from blade 115 and reject arms 156 are energized to knock pit 78 loose from teeth 130 or 134 if it should be stuck thereto.

This completes the cycle which may then be begun again.

As best seen in Fig. 11, the drupe engaging jaws 260 grip the halves circumferentially of each half, and in dotted position 261 the said jaws are shown in engagement with a relatively small peach, in which case they form substantially a continuous contact with the outer surface of each half. In the full line position a very large peach is indicated.

As mentioned in describing the jaws, the surfaces of the bands 264 that engage the fruit halves extend slightly slantingly tangentially relative to a circle that is coaxial with shaft 199. The ends of the bands nearest the axis of shaft 199 are the trailing ends when said jaws 260 are revolved about said axis in gripping relation to the fruit.

However, the bands yieldably seat themselves on the halves by rotation of supporting pins 253 as well as by stretching of said bands, when the jaws are swung into fruit engaging relation, and the surfaces of said bands may be formed with ribs and recesses 265 extending transversely thereacross to provide friction surfaces in engagement with the fruit.

By this tangential arrangement of bands 260 no injury is done to the fruit halves and the fruit engaging surfaces of the jaws follow irregularities in the contours of the fruit.

The relatively close relationship of the jaws of the fruit gripping devices to each other combined with the structure enabling the fruit engaging sides of the fruit gripping jaws to conform to irregularities in the contour of the fruit halves closely adjacent their cut faces is important, since the fruit halves would otherwise be mutilated by any attempt to rotate them relative to the pit. The cups 280 virtually constitute resilient, flexible plungers that function to prevent the meat of the halves from tearing away from the pit in a manner to objectionably mutilate the halves.

In this connection it should be pointed out that the fibers connecting the pits and the meat are sheared off at the pit by virtue of the pressure applied by the jaws 260 and cup 280 when said jaws and cup are rotated. Thus the pit cavity of each half and the surface of each pit, are quite clean after the pit has been freed from the halves.

The result is virtually no loss of fruit, and the pits can be dried and used for their by product values in a fraction of the time now required.

By rotating the jaws 260 simultaneously and with the same power, a simultaneous freeing of the pit from the halves is effected, thus reducing the likelihood of slippage of the pit relative to the teeth on blades 114, 115 to practically zero. If one half were to be released from the pit before the other half, the torque on the pit from said other half would meet with no resistance from the reverse torque of the half that was freed first, but where the same torque is applied at the same time, each nullifies the effect of the other and very little force is required to hold the pit.

The revolving of the jaws 260 is fast and is done quite suddenly but only after the jaws have firmly gripped the fruit halves. This action is quite important in effecting a clean separation between the meat of the halves and the pit without causing rejectionable mutilation of the halves. The sudden revolving of the circumferentially gripped halves that are pressed toward each other in their midportions is at a rate of speed sufficiently rapid to transmit sufficient torque force from the gripping jaws through the cells of the meat to shear the meat from the pit without noticeable rupture of said cells adjacent to the jaws. If the jaws were slowly revolved, there would be a slow, noticeable and objectionable rupturing of the meat adjacent to the gripping jaws where the initial force from the jaws is transmitted to the halves, but by quickly rotating the halves while they are gripped by the jaws there is no such injury.

It is pertinent to note that the blades 114, 115 form hard, flat surfaces against which the cut faces of the halves are supported. This entry of the blades between the halves tends to force the halves apart and if the halves were then to be merely twisted by the application of a gripping pressure, such as might be applied by the fingers of the hands, the meat of the halves would not only be objectionably ruptured at the points of engagement between the fingers and the halves, but the meat would be torn from the pit instead of the pit connecting fibers being sheared off at the pit. By applying pressure against the midportions of the halves and circumferentially gripping the halves, the said fibers are sheared off and the halves are not mutilated.

It should also be remarked that in the present invention the halves are circumferentially gripped about a horizontal axis and are rotated relative to the pit about a horizontal axis and at opposite sides of a vertical plane bisecting the body. Thus any juice that might come from the cut body will not contact the fruit gripping surfaces, and they will remain clean. Also the use of the solid rubber or plastic bands (not foam or sponge rubber or the like) prevents water or other liquid that might contact them from being absorbed, and they can be washed easily and quickly.

Attention may be called to the fact that in order that the fruit engaging jaws 260 may conform to any circumferential irregularity that may occur in a fruit half I have provided helical compression spring 243 surrounding each jaw support rod 239. This enables each jaw 260 to act independently of the others in conforming to the circumference of a drupe half.

I claim:

1. In a drupe pitter that includes a support for supporting a drupe at a predetermined point with the outer surfaces of opposite halves of said drupe exposed for gripping by drupe gripping devices, a pair of drupe gripping devices at opposite sides of said point each comprising a plurality of elements spaced about an axis extending through said point and common to said halves of a drupe supported at said point, each of said elements having an elongated concavely curved drupe engaging surface facing generally radially inwardly toward said axis and extending substantially tangentially from one end of each element in the same direction outwardly of a circle coaxial with said axis, said drupe engaging surfaces being adapted to engage the outer surfaces only of a drupe, means mounting said elements for movement radially inwardly and toward said axis, a pivot connecting each element with said last mentioned means for swinging of said elements to positions in which their said drupe engaging surfaces are substantially concentric with said axis, whereby said surfaces will accommodate themselves to variations in the contours of the outside surfaces of the said halves of drupes positioned at said point, and means connected with said elements for so moving them radially inwardly toward said axis and into engagement with said opposite halves of a drupe on said support.

2. In a drupe pitter that includes a support for supporting a drupe at a predetermined point with the outer surfaces of opposite halves of said drupe exposed for gripping by drupe gripping devices, a pair of drupe gripping devices at opposite sides of said point each comprising a plurality of elements spaced about an axis extending through said point and common to said halves of a drupe supported at said point, each of said elements having an elongated concavely curved drupe engaging surface facing generally radially inwardly toward said axis and extending substantially tangentially from one end of each element in the same direction outwardly of a circle coaxial with said axis, said drupe engaging surfaces being adapted to engage the outer surfaces only of a drupe, means mounting said elements for movement radially inwardly and toward said axis, a pivot connecting each element with said last mentioned means for swinging of said elements to positions in which their said drupe engaging surfaces are substantially concentric with said axis, whereby said surfaces will accommodate themselves to variations in the contours of the outside surfaces of the said halves of drupes positioned at said point, and means connected with said elements for so moving them radially inwardly toward said axis and into engagement with said opposite halves of a drupe on said support, yieldable means connected with each of said elements for yieldably urging them to said positions extending substantially tangentially outwardly of said circle.

3. In a drupe pitter that includes a support for supporting a drupe at a predetermined point with the outer surfaces of opposite halves of said drupe exposed for gripping by drupe gripping devices, a pair of drupe gripping devices at opposite sides of said point each comprising a plurality of elements spaced about an axis extending through said point and common to said halves of a drupe supported at said point, each of said elements having an elongated concavely curved drupe engaging surface facing generally radially inwardly toward said axis and extending substantially tangentially from one end of each element in the same direction outwardly of a circle coaxial with said axis, said drupe engaging surfaces being adapted to engage the outer surfaces only of a drupe, means mounting said elements for movement radially inwardly and toward said axis, a pivot connecting each element with said last mentioned means for swinging of said elements to positions in which their said drupe engaging surfaces are substantially concentric with said axis, whereby said surfaces will accommodate themselves to variations in the contours of the outside surfaces of the said halves of drupes positioned at said point, and means connected with said elements for so moving them radially inwardly toward said axis and into engagement with said opposite halves of a drupe on said support, means connected with the means mounting said elements for revolving said elements in one direction about said axis when said elements are moved into engagement with the outer surfaces of said halves of said drupe in a direction in which said one end of each element is the trailing end.

4. In a drupe pitter having a stationary frame and drupe supporting means thereon for supporting a clingstone drupe by its pit at a predetermined point with said drupe bisected to its pit in a plane extending centrally through said drupe and with the outside surfaces of the halves of said drupe at opposite sides of said plane exposed for engagement with drupe gripping means; a pair of substantially coaxial shafts, means on said frame supporting said shafts at opposite sides of said point substantially aligned on an axis perpendicular to said plane, drupe gripping means carried by said shafts at opposite sides of said point for movement into engagement with said outside surfaces of said opposite halves of a drupe supported at said point along annular coaxial lines concentric with said axis, drupe engaging means on said axis and carried by said shafts separate from said drupe gripping means for movement along said axis and into engagement with the midportions of said drupe halves, separate yieldable means respectively connected with said drupe gripping means and with said drupe engaging means for yieldably urging said drupe gripping means and said drupe engaging means into yieldable contact with said outside surfaces of said halves of a drupe supported at said point, and means connected with said drupe engaging means for moving them simultaneously into said yieldable contact with said outside surfaces whereby the pressure of the drupe engaging means against said midportion at one side of said plane will be counteracted by the pressure of the drupe engaging means at the other side of said plane, said drupe engaging means each including a flexible support therefor yieldably supporting said drupe engaging means for movement thereof in any direction transversely of said axis under the influence of irregularities in the surface contour of the midportions of the drupes adapted to be engaged by said drupe engaging means.

5. In a drupe pitter, a pair of spaced opposed pit gripping means adapted to grip between them the pit of a clingstone drupe that has been bisected to said pit upon movement of one of said pitting means toward the other when such pit is between them, means supporting one of said means for movement toward the other and means connected with said one of said means for causing said movement, drupe engaging means, means supporting said drupe engaging means adjacent to but spaced from said pit gripping means for movement toward the space between said pit gripping means and into firm engagement with the outside surface of the flesh of a clingstone drupe when its pit is held by and between said pit gripping means, means connected with said drupe gripping means for moving the same and the flesh of the drupe engaged when said drupe engaging means is in engagement with said flesh and when said pit is held by said pit gripping means for freeing said pit from said flesh, and a pit striker adjacent to and alongside said pit gripping means movable into engagement with a pit disposed between said pit gripping means, after such pit is freed from said flesh and means connected with said pit striker for moving the latter into said engagement with said pit.

References Cited in the file of this patent

UNITED STATES PATENTS

| | | |
|---|---|---|
| 474,901 | Carter | May 17, 1892 |
| 596,343 | Topp | Dec. 28, 1897 |
| 666,701 | Scheidler et al. | Jan. 29, 1901 |
| 1,365,397 | Gormley et al. | Jan. 11, 1921 |
| 1,403,852 | Ensele | Jan. 17, 1922 |
| 1,471,838 | Duncan | Oct. 23, 1923 |
| 1,605,532 | Duncan | Nov. 2, 1926 |
| 1,775,918 | Smith | Sept. 16, 1930 |
| 1,777,417 | Ridley | Oct. 7, 1930 |
| 1,785,011 | Felizianetti | Dec. 16, 1930 |
| 1,794,479 | Smith | Mar. 3, 1931 |
| 2,272,415 | McLauchlan | Feb. 10, 1942 |
| 2,429,749 | Dunn | Oct. 28, 1947 |
| 2,664,127 | Perrelli | Dec. 29, 1953 |